(12) United States Patent
Weigl et al.

(10) Patent No.: US 7,376,496 B1
(45) Date of Patent: May 20, 2008

(54) SPACECRAFT MAGNETIC MOMENTUM CONTROL SYSTEM

(75) Inventors: Harald J. Weigl, Doylestown, PA (US); Neil E. Goodzeit, Princeton, NJ (US); Santosh Ratan, Highland Park, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 40 days.

(21) Appl. No.: 11/452,959

(22) Filed: Jun. 15, 2006

Related U.S. Application Data

(60) Provisional application No. 60/749,629, filed on Dec. 13, 2005.

(51) Int. Cl.
 *B64G 1/36* (2006.01)
(52) U.S. Cl. .......................... 701/13; 244/164
(58) Field of Classification Search .................. 701/13, 701/3; 244/164, 165, 166
See application file for complete search history.

(56) References Cited

U.S. PATENT DOCUMENTS 6,517,029 B1 * 2/2003 Holmes ....................... 244/164

7,149,610 B2 * 12/2006 Wang et al. ................... 701/13
2005/0049764 A1 * 3/2005 Wang et al. ................... 701/13
2007/0083345 A1 * 4/2007 Fowell ........................ 702/190

\* cited by examiner

*Primary Examiner*—Mark Hellner
(74) *Attorney, Agent, or Firm*—McDermott Will & Emery LLP

(57) ABSTRACT

Momentum control is maintained in a geosynchronous orbiting spacecraft that uses a plurality of reaction wheel assemblies and a plurality of magnetic torquers to control the spacecraft momentum, each orbit of the spacecraft being comprised of a set of time steps, by determining a current momentum error for a current time step of a current orbit by adding a system momentum change determined for an immediately preceding orbit to an average system momentum determined for the immediately preceding orbit, and then subtracting a magnetic control torque momentum change determined for the immediately preceding orbit, determining a current duty cycle for each of the magnetic torquers based on the current momentum error and on a torque value applied by each magnetic torquer at each time step of the immediately preceding orbit, and commanding each magnetic torquer to operate at the current time step in accordance with its respective determined current duty cycle, wherein the magnetic torquers apply a magnetic momentum control torque to the spacecraft to offset the current momentum error.

18 Claims, 7 Drawing Sheets

SPACECRAFT MAGNETIC MOMENTUM CONTROL SYSTEM

CROSS-REFERENCES AND RELATED APPLICATIONS

This application claims priority to U.S. Provisional Application No. 60/749,629, filed on Dec. 13, 2005, and entitled "IMPROVED SPACECRAFT MAGNETIC MOMENTUM CONTROL SYSTEM", which is incorporated by reference herein in its entirety for all purposes.

STATEMENT REGARDING FEDERALLY SPONSORED RESEARCH OR DEVELOPMENT

Not Applicable.

FIELD OF THE INVENTION

The present invention generally relates to spacecraft control systems, and, in particular, relates to magnetic momentum control systems for spacecraft.

BACKGROUND OF THE INVENTION

Spacecraft that operate in middle Earth orbits (MEO) or lower orbits typically use magnetic torquers for Reaction Wheel Assembly (RWA) momentum control. By applying current to one or more torquer coils, a magnetic dipole is generated that interacts with the Earth's magnetic field to produce an external torque on the spacecraft. Spacecraft in MEO or lower orbits (LEO) use magnetic torquing because it is more mass efficient than thruster torquing, which must use propellant stored on board the spacecraft. In addition, magnetic torquing also provides the advantage of not perturbing the spacecraft orbit, which occurs with thruster torquing, because no forces are applied to the spacecraft during magnetic torquing. This is important for missions such as GPS, where it is desirable not to perturb the spacecraft orbit because precise orbital knowledge accuracy must be maintained at all times.

Prior-art magnetic momentum control (MMC) systems operate on the total spacecraft momentum error or the RWA momentum error that exists at any given time. At each control cycle, the torquer current or "on time" is commanded so as to reduce the present momentum error. One drawback of this approach is that torques are applied to reduce the effects of both cyclic (periodic) and secular momentum components. This approach wastes control authority and power by applying torque to reduce cyclic components that don't result in momentum growth. Another problem is that some portions of the orbit may have more favorable magnetic control geometry than others, yet the prior-art algorithm does not take into account how the magnetic field varies over the orbit. These deficiencies impact the magnetic torquer sizing, resulting in the need for larger torquers and more torquer power than necessary to control the RWA momentum.

Specifically, conventional MMC systems calculate the control torque that needs to be applied by each torquer based on the instantaneous system momentum error. In general, the control torque generated by each magnetic torquer, denoted by the subscript i, is computed using Equation 1 as the cross product between the torquer dipole moment vector and the instantaneous local magnetic field vector.

$$T_i(t) = m_i(t) \times B(t) \quad (1)$$

The magnetic field vector $m_i(t)$ depends on the spacecraft orbit position. It may be estimated using an Earth magnetic field model or may be measured using a magnetometer. Such vectors are typically expressed in an inertial coordinate frame and, therefore, the torquer dipole moment vector, which is fixed in the body frame, also varies as a function of the spacecraft attitude.

Such a conventional MMC system generally operates with a sampling period of $t_s$ (the time interval between samples) and attempts to drive the total system momentum to zero (the sum of the spacecraft body momentum and the RWA momentum). For this conventional system, the torquer duty cycles (the ratio of the torquer commanded on-times to the sampling period) may be computed using Equation 2. The computed duty cycle may be a positive value or a negative value. In the case that the duty cycle value is negative, the current to the torquer is reversed (reverse polarity).

$$\begin{bmatrix} dc_1[k] \\ dc_2[k] \end{bmatrix} = -\frac{1}{t_s} K^+ H_{sys}[k]$$

where $$K^+ = \text{pseudoinverse}([T_1[k] T_2[k]]) \quad (2)$$

and $$H_{sys}[k] = H_{s/c}[k] + H_{rwa}[k]$$

Computing the control torques by using the pseudo-inverse of the control torque matrix, as shown above, minimizes the torquer duty cycles given the orientation of the torquer torque vectors and the Earth's magnetic field. This approach also reduces the overall RWA speeds. However, as mentioned above, a major disadvantage of this conventional MMC control method is that it responds to the total momentum error, including the momentum changes that are periodic over one orbit. These periodic (or cyclic) momentum changes may be large at times, but do not increase RWA speeds over an orbit. Therefore, responding to the cyclic momentum components wastes power and torquer control authority. Furthermore, in using the conventional approach, the applied torque depends on only the present Earth magnetic field vector. The conventional MMC method therefore wastes power by torquing to the maximum extent possible at all orbit positions, regardless of whether or not favorable geometry exists based on changes in the Earth magnetic field vector as the spacecraft changes position during the orbit.

In a spacecraft that uses reaction wheel assemblies (RWAs) for momentum control, the applied RWA torque must counteract the effects of environmental disturbance torques acting on the spacecraft body, thereby causing the magnitude of the RWA speeds to increase over time. The environmental disturbances, which include torques due to solar radiation pressure, gravity gradient and radio frequency (RF) transmissions, may be large for a spacecraft with large deployed antennas and solar arrays, such as a next-generation GPS spacecraft.

For spacecraft that experience large disturbance torques, using conventional MMC systems that apply magnetic torques to null a momentum error that includes both secular and periodic components requires the use of increased duty cycles and power to the magnetic torquers and/or larger torquers, which are heavy, require increased power, and are difficult to accommodate on the spacecraft panels.

In view of the above, a need exists for a more efficient magnetic momentum control system that responds to the secular momentum error component while ignoring the cyclic momentum components, that takes into account the variations of the Earth's magnetic field over the entire orbit of the spacecraft, and that applies magnetic momentum control torques where it is most efficient to do so.

SUMMARY OF THE INVENTION

The present invention solves the foregoing problems by providing a magnetic momentum control system (MMC) for orbiting spacecraft which use reaction wheel assemblies to control the spacecraft attitude. The invention uses magnetic torquers to null a momentum error that is the predicted secular growth over the next full orbit. In this regard, the magnetic momentum control system of the present invention controls only the growth (secular) term of the spacecraft momentum, while ignoring the periodic (cyclic) momentum components that do not result in RWA speed growth. In addition, the magnetic momentum control system of the present invention also computes the magnetic torquer duty cycles taking into account how the Earth's magnetic field varies over the entire orbit of the spacecraft.

According to one embodiment, the invention is directed to a method for maintaining momentum control of an orbiting spacecraft that uses a plurality of reaction wheel assemblies and a plurality of magnetic torquers to control the spacecraft momentum, each orbit of the spacecraft being comprised of a set of time steps, the method including the steps of determining a current momentum error for a current time step of a current orbit by adding a system momentum change determined for an immediately preceding orbit to an average system momentum determined for the immediately preceding orbit, and then subtracting a magnetic control torque momentum change determined for the immediately preceding orbit, determining a current duty cycle for each of the magnetic torquers based on the current momentum error and on a torque value applied by each magnetic torquer at each time step of the immediately preceding orbit, and commanding each magnetic torquer to operate at the current time step in accordance with its respective determined current duty cycle, wherein the magnetic torquers apply a magnetic momentum control torque to the spacecraft to offset the current momentum error.

In another embodiment, a magnetic momentum control system is provided for maintaining momentum control of an orbiting spacecraft that uses a plurality of reaction wheel assemblies, each orbit of the spacecraft being comprised of a set of time steps, the magnetic momentum control system including a plurality of magnetic torquers, and a processor operable to perform the steps of determining a current momentum error for a current time step of a current orbit by adding a system momentum change determined for an immediately preceding orbit to an average system momentum determined for the immediately preceding orbit, and then subtracting a magnetic control torque momentum change determined for the immediately preceding orbit, determining a current duty cycle for each of the magnetic torquers based on the current momentum error and on a torque value applied by each magnetic torquer at each time step of the immediately preceding orbit, and commanding each magnetic torquer to operate for the current time step in accordance with its respective determined current duty cycle, wherein the magnetic torquers apply a magnetic momentum control torque to the spacecraft to offset the current momentum error.

In yet a further embodiment, the present invention is directed to an orbiting spacecraft, each orbit of the spacecraft being comprised of a set of time steps. The spacecraft includes a plurality of reaction wheel assemblies, a plurality of magnetic torquers, and a processor operable to perform the steps of determining a current momentum error for a current time step of a current orbit by adding a system momentum change determined for an immediately preceding orbit to an average system momentum determined for the immediately preceding orbit, and then subtracting a magnetic control torque momentum change determined for the immediately preceding orbit, determining a current duty cycle for each of the magnetic torquers based on the current momentum error and on a torque value applied by each magnetic torquer at each time step of the immediately preceding orbit, and commanding each magnetic torquer to operate for the current time step in accordance with its respective determined current duty cycle, wherein the magnetic torquers apply a magnetic momentum control torque to the spacecraft to offset the current momentum error.

In exemplary embodiments, the system momentum change is calculated by comparing a current system momentum to a previous system momentum measured at a same position of the immediately preceding orbit, and the average system momentum is based on a sum of the system momentum over the immediately preceding orbit. The magnetic control torque momentum change is calculated by comparing a current magnetic control torque momentum to a previous magnetic control torque momentum determined at a same position of the immediately preceding orbit. The control torque values used to calculate the duty cycles are based on a time-variant Earth magnetic field model. The magnetic torquers are commanded to operate for the current time step in accordance with their respective determined current duty cycles.

In this manner, the present invention results in significantly reduced torquer duty cycles for the magnetic torquers and thereby reduces the power consumption used for the magnetic torquers, thereby allowing for the use of smaller magnetic torquers.

In the following description of the preferred embodiment, reference is made to the accompanying attachment that forms a part thereof, and in which is shown by way of illustration a specific embodiment in which the invention may be practiced. It is to be understood that other embodiments may be utilized and changes may be made without departing from the scope of the present invention.

DETAILED DESCRIPTION OF THE INVENTION

As mentioned above, the present invention solves the problems of the conventional magnetic momentum control method by providing a magnetic momentum control method and system that only respond to the secular momentum error component, while ignoring the cyclic momentum components. The method and system of the present invention also takes into account the variation of the Earth's magnetic field over the entire orbit, and applies magnetic momentum control torques where it is most efficient to do so. The present invention thereby results in a dramatic decrease in the magnetic torquer duty cycles and corresponding power savings. For example, for a reference MEO mission in a 55 deg inclination orbit, the torquer duty cycles according to the present invention are reduced by up to 84% compared to a conventional MMC system.

Figure 1:
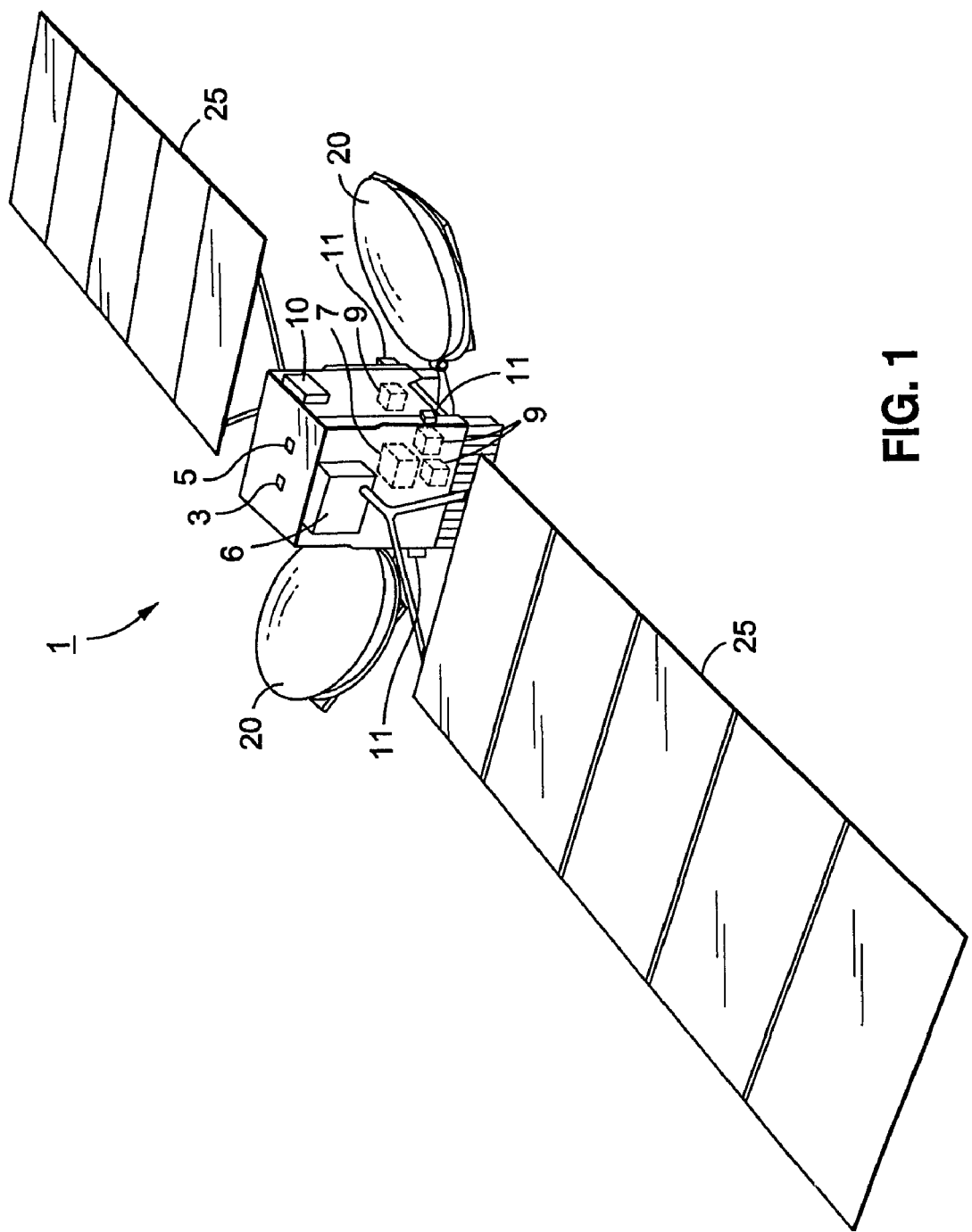
FIG. 1 is a diagram of an exemplary spacecraft in which the invention may be practiced according to one embodiment of the present invention.

FIG. 1 is an exemplary spacecraft in which the invention may be practiced. As seen in FIG. 1, spacecraft 1 is shown in which the invention may be implemented. In particular, spacecraft 1 depicted in FIG. 1 is seen to include earth sensor 3, sun sensor 5, inertial measurement unit 7, multiple reaction wheel assemblies 9, multiple magnetic torquers 10, thrusters 11, two antennas 20, and two solar panels 25 that extend from opposite sides of spacecraft 1. Spacecraft 1 also includes on-board computer 6 that includes a processor and a memory that stores computer-executable process steps for execution by the processor.

Figure 2:
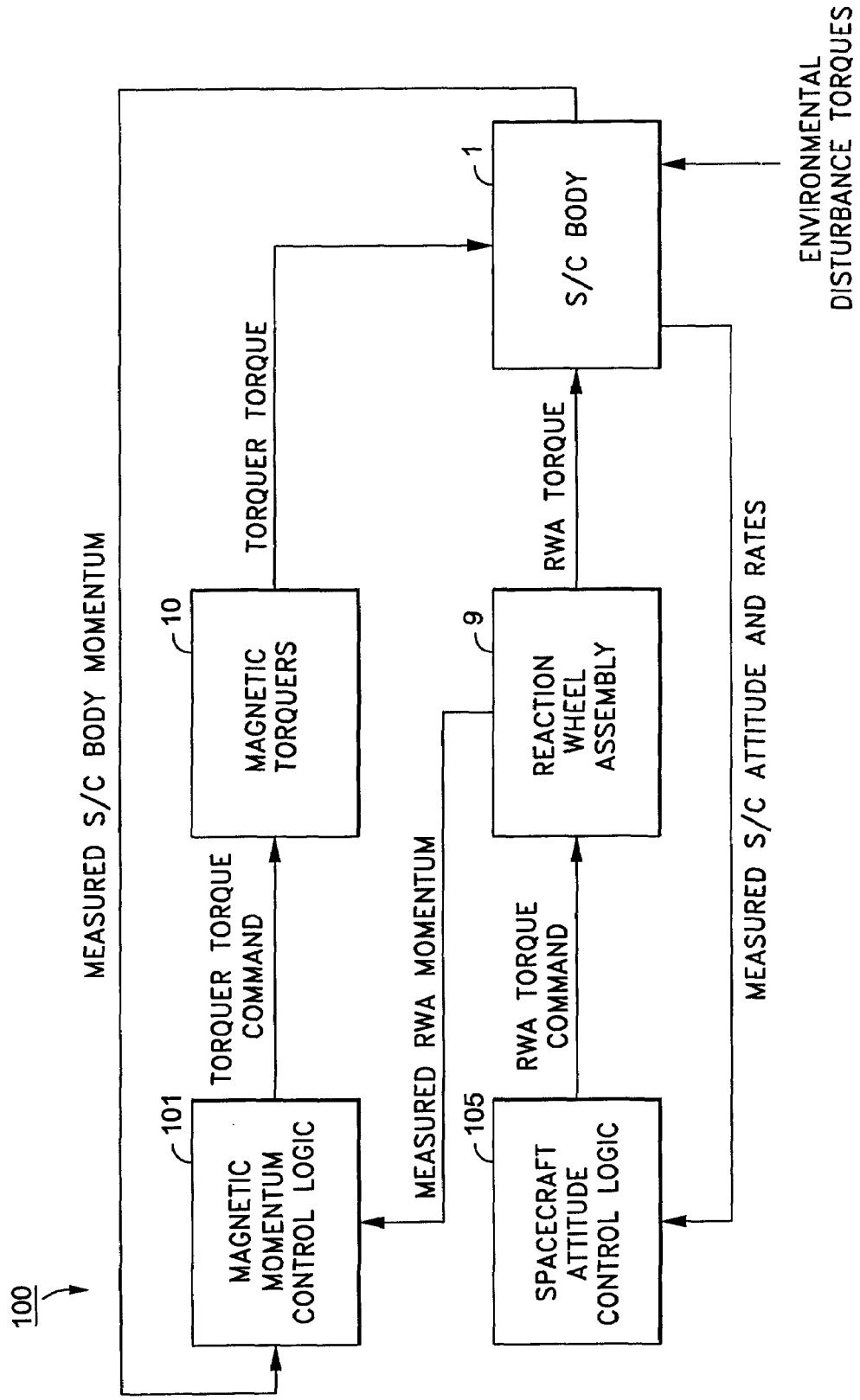
FIG. 2 is a block diagram of a magnetic momentum control system according to one embodiment of the present invention.

FIG. 2 shows a magnetic momentum control (MMC) system which is integrated into a spacecraft attitude control system that uses reaction wheel assemblies (RWAs). The lower portion of FIG. 2 shows the elements of the attitude control system, and the upper portion of FIG. 2 shows the elements of the magnetic momentum control (MMC) system. The spacecraft attitude control logic 105 computes the error between the measured spacecraft three-axis attitude and angular rates and the desired attitude and rates. Based on this error, the spacecraft attitude control logic 105 calculates the three-axis control torque command that nulls the error. In accordance with the command, the control torque is applied to the spacecraft body 1 through several RWAs 9. For the examples discussed below, the spacecraft follows a Sun Nadir Pointing (SNP) attitude profile. As shown in FIG. 2, the applied RWA torque counteracts the effects of environmental disturbance torques acting on the spacecraft body 1. This causes the magnitude of the RWA speeds to increase over time. The environmental disturbances, which include torques due to solar radiation pressure, gravity gradient and radio frequency (RF) transmissions, may be large for a spacecraft with large deployed antennas 20 and solar arrays 25, such as a next-generation GPS spacecraft.

It is necessary to maintain the RWA speeds within acceptable speed limits. Furthermore, it is desirable to maintain the lowest possible RWA speeds since this results in lower power consumption by the spacecraft, and also allows the use of smaller and lighter reaction wheels. For missions such as GPS, it is not feasible to control the RWA momentum by firing thrusters since this would apply disturbance forces to the spacecraft and reduce the spacecraft orbital position knowledge, thereby interfering with spacecraft operations. A magnetic momentum control (MMC) system allows continuous mission operations while controlling RWA momentum, instead of using thrusters to control the RWA momentum. FIG. 2 shows the MMC logic 101 that calculates a momentum error as the sum of the calculated RWA angular momentum and the calculated spacecraft body angular momentum. The MMC logic determines a torquer command for the magnetic torquers 10 which then apply an external torque to the spacecraft 1 to reduce the momentum error.

Magnetic torquers 10 may be implemented as either air coils or torque rods. A set of two torquers is used in one exemplary embodiment of the invention to reduce the mass of the MMC system, but additional torquers can be used depending on the application. The dipole moment vectors of the magnetic torquers are oriented along different body axes of spacecraft 1 to provide control of the three-axis RWA momentum over an orbit. The control torque applied by each of magnetic torquers 10, (denoted below by the subscript i), is computed using Equation 1 above as the cross product between the torquer dipole moment vector and the instantaneous local Earth magnetic field vector. As mentioned above, the Earth magnetic field vector depends on the spacecraft orbit. It may be estimated using an Earth magnetic field model or measured using a magnetometer. All of the vectors described herein are expressed in an inertial coordinate frame. Therefore, the torquer dipole moment vector, which is fixed in the body frame, varies as a function of the spacecraft attitude.

The magnetic momentum control (MMC) system of the present invention implements an algorithm that controls the RWA momentum by responding to the secular momentum error component, while ignoring the cyclic momentum components. The method and system of the present invention also accounts for the variations in the Earth's magnetic field over the entire orbit, and applies magnetic momentum control torques in the most efficient manner. In this manner, the MMC system of the invention reduces the overall power required to control the RWA speeds compared to conventional MMC systems that act only on the instantaneous momentum error. In addition, the invention allows the torquer dipole and mass to be reduced, since it makes more efficient use of the magnetic torquers to control momentum.

The MMC system of the invention ignores the cyclic variations in the inertial momentum and acts to null the growth in system momentum due to environmental disturbances expected over an orbit period $t_{orbit}$. In this regard, the change in system momentum over an orbit is computed using Equation 3 below:

$$\Delta H_{sys}[k]=H_{sys}[k-1]-H_{sys}[k-1-n]$$

where $$n \cdot t_s = t_{orbit} \qquad (3)$$

In Equation 3, $\Delta H_{sys}[k]$ is the system momentum change as determined at the current time step k, $H_{sys}[k-1]$ is the system momentum for the immediately preceding time step [k−1], and $H_{sys}[k-1-n]$ is the system momentum for the time step [k−1−n] of the immediately preceding orbit that corresponds to the immediately preceding time step [k−1] of the current orbit. The system momentum $H_{sys}=H_{s/c}+H_{rwa}$, where $H_{s/c}$ is the measured momentum of the spacecraft and $H_{rwa}$ is the measured momentum of the reaction wheel assemblies. The quantities of Equation 3 above are expressed in an inertial coordinate frame, however, these quantities could be expressed in other coordinate frames by a person skilled in the art.

The invention also accounts for the change in inertial momentum due to the applied magnetic control torque over the previous orbit. This momentum change due to the applied magnetic control torque is calculated using Equation 4.

$$\Delta H_{cnt}[k]=H_{cnt}[k-1]-H_{cnt}[k-1-n] \quad (4)$$

In Equation 4, $\Delta H_{cnt}[k]$ is the magnetic control torque momentum change as determined at the current time step k, $H_{cnt}[k-1]$ is the magnetic control torque momentum for the immediately preceding time step [k−1], and $H_{cnt}[k-1-n]$ is the magnetic control torque momentum for the time step [k−1−n] of immediately preceding orbit that corresponds to the immediately preceding time step [k−1] of the current orbit. The quantity calculated in Equation 4 represents the integrated effect of the momentum adjustment control torque over the immediately preceding orbit period.

To reduce the overall RWA speeds, the invention also acts on the average system momentum over the previous orbit as calculated using Equation 5.

$$\overline{H}_{sys}[k] = \sum_{(j=k-1-n)}^{(k-1)} \frac{H_{sys}[j]}{n+1} \quad (5)$$

Figure 6:
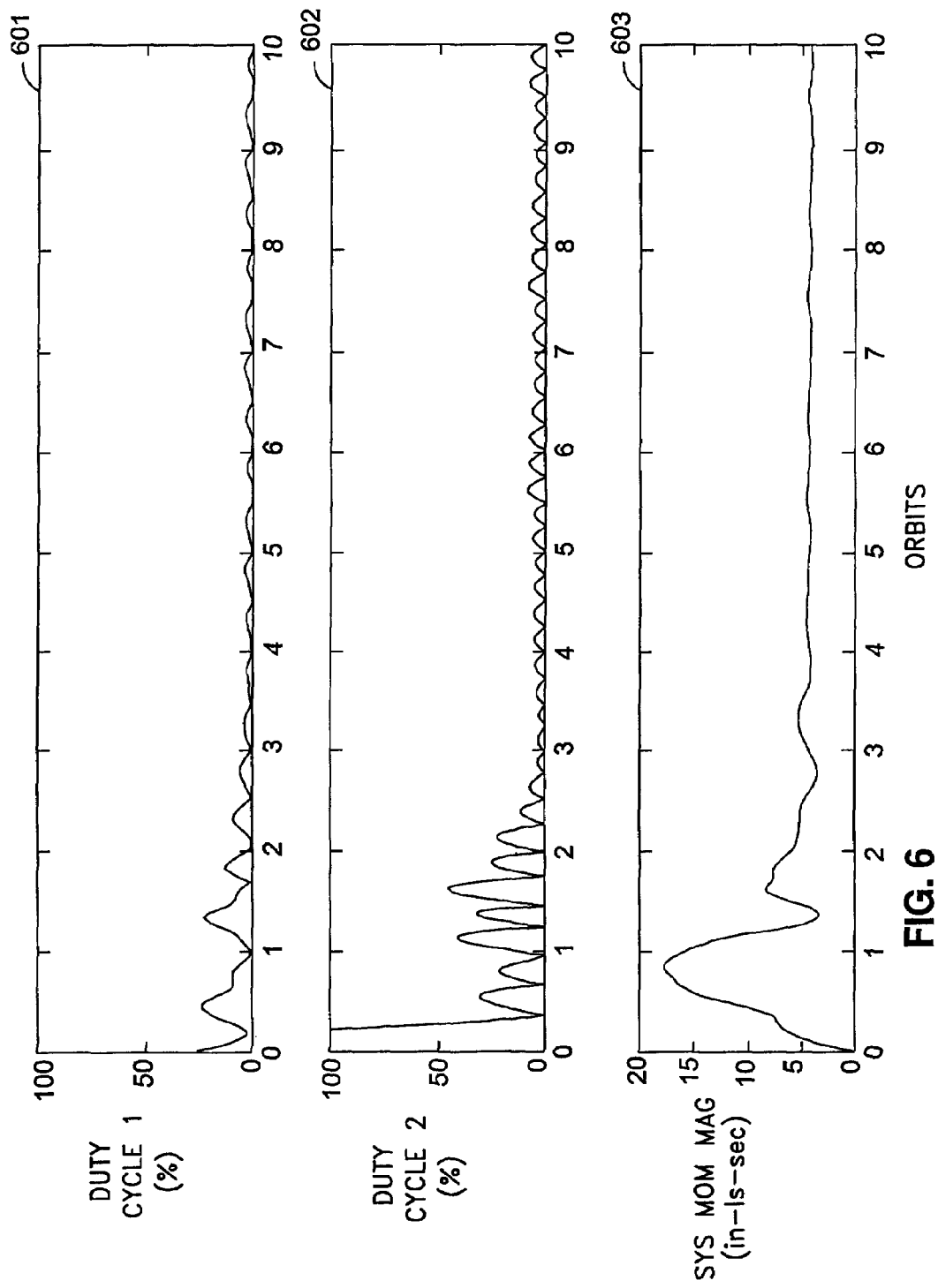
FIG. 6 is a set of data graphs that illustrate the performance of a magnetic momentum control system, according to one embodiment of the present invention, responding to lowest-case disturbance torques.

In Equation 5, $\overline{H}_{sys}[k]$ is the average system momentum for the current time step k, and all values of $H_{sys}$ are averaged for the time steps between the immediately preceding time step [k−1] and the time step [k−1−n] of the immediately preceding orbit that corresponds to the immediately preceding time step [k−1]. The momentum error that is used by the MMC algorithm of the MMC system of the present invention is computed as the difference between the change in system momentum and the control momentum plus the average system momentum over the previous orbit, as shown in FIG. 6.

$$H_{err}[k]=\Delta H_{sys}[k]-\Delta H_{cnt}[k]+\overline{H}_{sys}[k] \quad (6)$$

The first two terms on the right side of Equation 6 provide an estimate of the expected momentum change due to environmental disturbances over the next orbit. The third term represents the residual average inertial momentum present in the system over the last orbit. As shown in Equation 1 above, the available control torque from each torquer varies over an orbit based on the spacecraft position in the orbit. The MMC system of the present invention utilizes more effective control torque conditions experienced over an orbit by using Equation 7 to solve for the control torques over an entire orbit that cancel the momentum error determined using Equation 6.

$$\begin{bmatrix} dc_1[k-n] \\ dc_2[k-n] \\ dc_1[k-n+1] \\ dc_2[k-n+1] \\ \vdots \\ dc_1[k-1] \\ dc_2[k-1] \\ dc_1[k] \\ dc_2[k] \end{bmatrix} = -\frac{1}{t_s}L + H_{err}[k]$$

where (7)

$$L^{+}=\text{pseudoinverse}([T_1[k-n]T_2[k-n] \ldots T_1[k]T_2[k]])$$

In Equation 7, the duty cycle (dc) vector on the left side of the equation is the calculated set of duty cycles for each of the magnetic torquers for all time steps between the current time step [k] of the current orbit and the prior orbit time step [k−n] which is one orbit period prior to the current time step, where $t_s$ is the time interval between successive time steps of the orbit, and $T_1$ and $T_2$ are the control torque values applied by the magnetic torquers, respectively, at each time step over the immediately preceding orbit, from [k−n] to [k]. The last two elements, $dc_1[k]$ and $dc_2[k]$, of the computed duty cycle vector are used as applied commands at each time step to command the magnetic torquers to apply an appropriate magnetic torque. The control law in Equation 7 is solved at each time step, thereby providing feedback that corrects for time varying disturbance torques and for errors in the applied control torques (due to uncertainties in the torquer dipole moment and the Earth magnetic field model, etc.).

Figure 3:
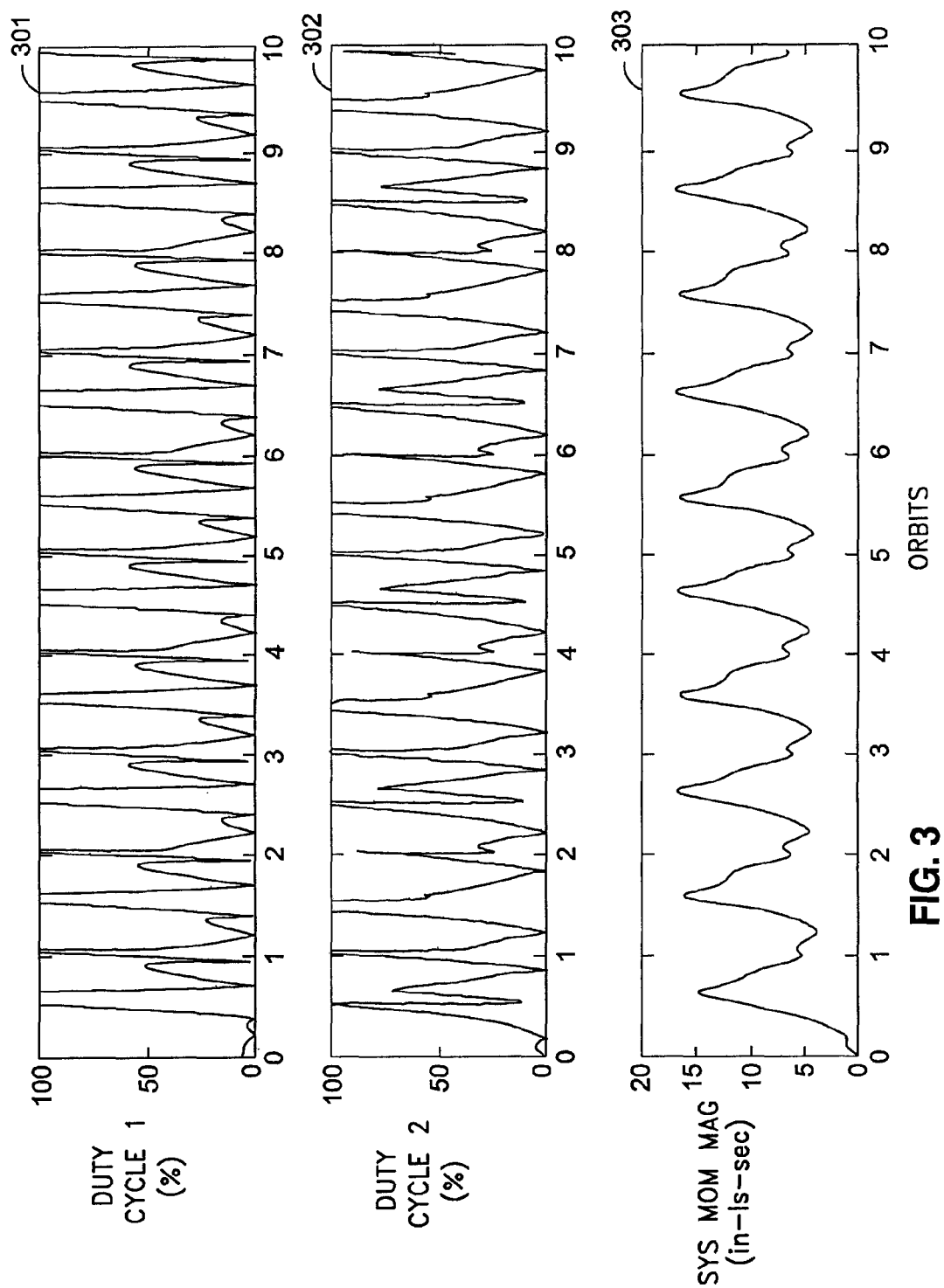
FIG. 3 is a set of data graphs that illustrate the performance of a conventional magnetic momentum control system responding to worst-case disturbance torques.
Figure 4:
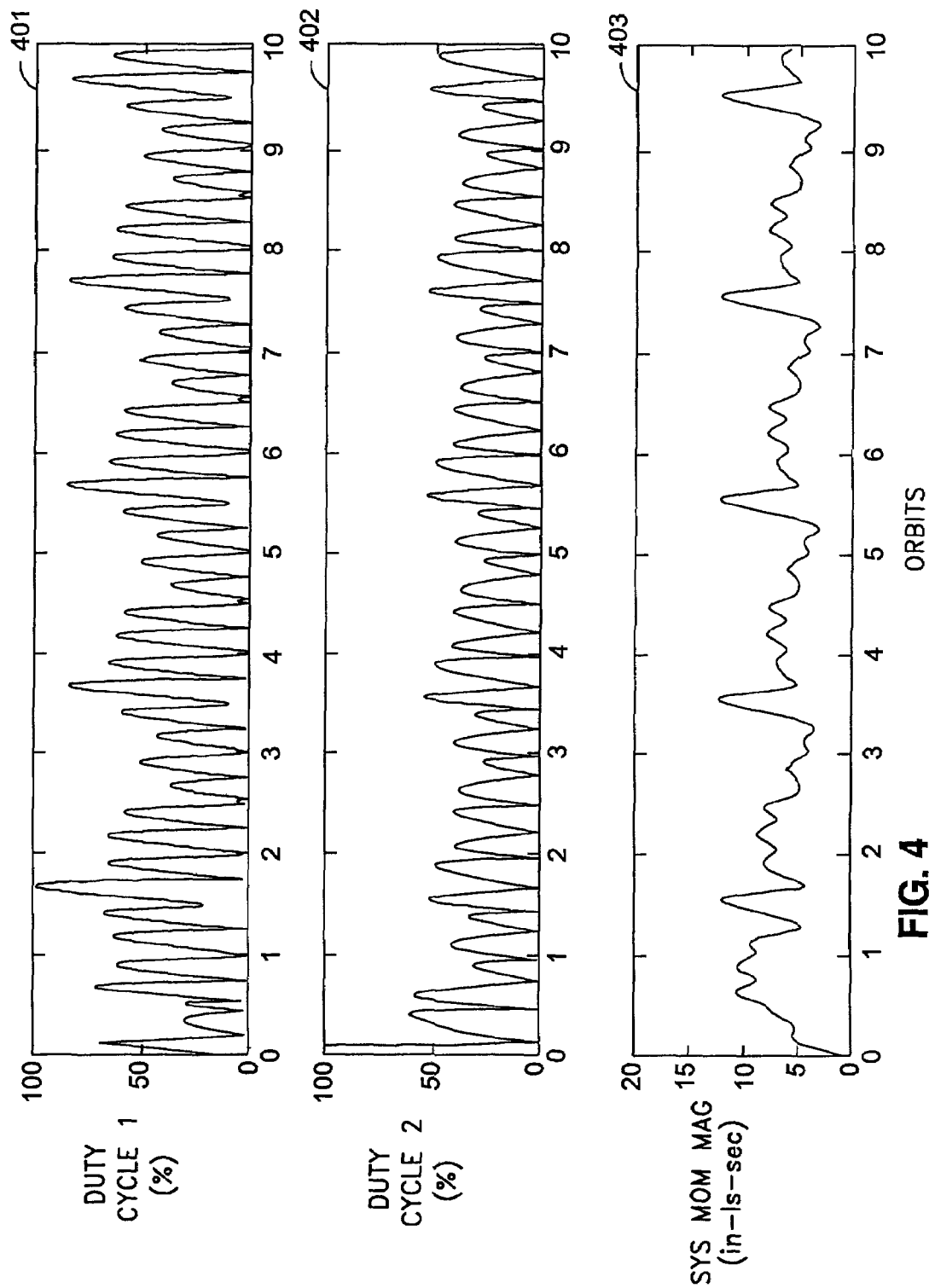
FIG. 4 is a set of data graphs that illustrate the performance of a magnetic momentum control system, according to one embodiment of the present invention, responding to worst-case disturbance torques.

A comparison of the performance of the conventional MMC system with the MMC system of the present invention is provided in FIGS. 3 through 6. These results are based on a simulation of a next-generation GPS spacecraft following a Sun Nadir Pointing (SNP) attitude profile. The results in FIGS. 3 and 4 correspond to a case in which the sun is 25° from the orbit plane. This sun beta angle produces the highest inertial momentum growth due to the environmental disturbance torques. FIG. 3 shows the conventional MMC performance for the sun beta angle of 25° including the magnetic torquer duty cycles 301 and 302, and the magnitude of the system momentum error 303. The MMC performance of the present invention for the sun beta angle of 25° is shown in FIG. 4 including the magnetic torquer duty cycles 401 and 402, and the magnitude of the system momentum error 403.

Figure 5:
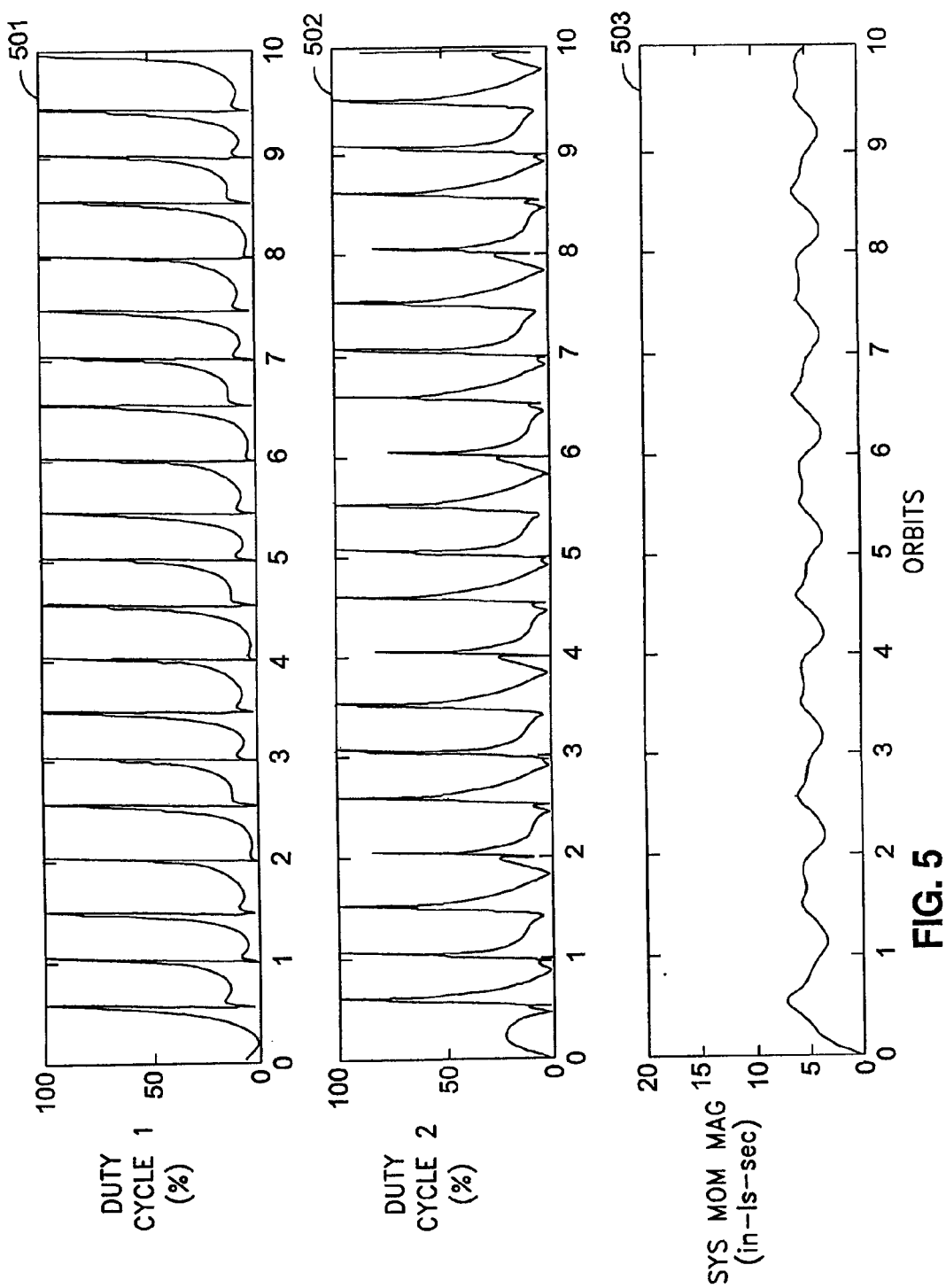
FIG. 5 is a set of data graphs that illustrate the performance of a conventional magnetic momentum control system responding to lowest-case disturbance torques.

FIGS. 5 and 6 show the results for the conventional MMC system and the MMC system of the present invention in a case in which the sun is 78° above the orbit plane. This sun beta angle produces a high cyclic disturbance, but has the lowest secular momentum growth. FIG. 5 shows the conventional MMC performance for the sun beta angle of 78° including the magnetic torquer duty cycles 501 and 502, and the magnitude of the system momentum error 503. The MMC performance of the present invention for the sun beta angle of 78° is shown in FIG. 6 including the magnetic torquer duty cycles 601 and 602, and the magnitude of the system momentum error 603.

For the worst-case momentum growth case for the sun beta angle of 25° shown in FIGS. 3 and 4, the MMC algorithm used in the present invention significantly reduces the peak and average torquer duty cycles. As shown in Table 1 below, the peak duty cycles for the conventional system in this case are 100% for both torquers, and these duty cycles reduce to 83% and 53% using the MMC system of the present invention. Also, the average torquer duty cycles and steady-state power reduce by 29% using the MMC system of the present invention. The improved MMC algorithm of the present invention also results in smaller momentum error, which results in lower RWA speeds and reduced RWA power consumption.

TABLE 1

Steady State Duty Cycles with Worst-Case Disturbance Torques

|  |  | Torquer 1 | Torquer 2 |
|---|---|---|---|
| Prior art | Peak | 100% | 100% |
|  | Average | 42% | 41% |
| Improved | Peak | 83% | 53% |
|  | Average | 33% | 26% |

Reduction in combined average duty cycle = 29%

Table 2 below shows an even larger reduction in average and peak power consumption (since most of the momentum change is periodic) for the case in which the sun beta angle is 78° and has minimum disturbance, as shown in FIGS. 5 and 6. The peak duty cycles reduce from 100% for the conventional MMC system to below 10% for the MMC system of the present invention, and the average duty cycles reduce by 84% in the MMC system of the present invention. The invention also provides a mass benefit by allowing the use of lighter torque rods with lower dipole moments. The torquer dipole moments for the GPS example presented here are sized to provide a factor-of-two torque margin. In this case, the improved MMC system requires 24% less dipole moment for each torquer than would be necessary using a conventional MMC system.

TABLE 2

Steady State Duty Cycles with Lowest Disturbance Torques

|  |  | Torquer 1 | Torquer 2 |
|---|---|---|---|
| Prior art | Peak | 100% | 100% |
|  | Average | 17% | 20% |
| Improved | Peak | 4% | 8% |
|  | Average | 2% | 4% |

Reduction in combined average duty cycle = 84%

Figure 7:
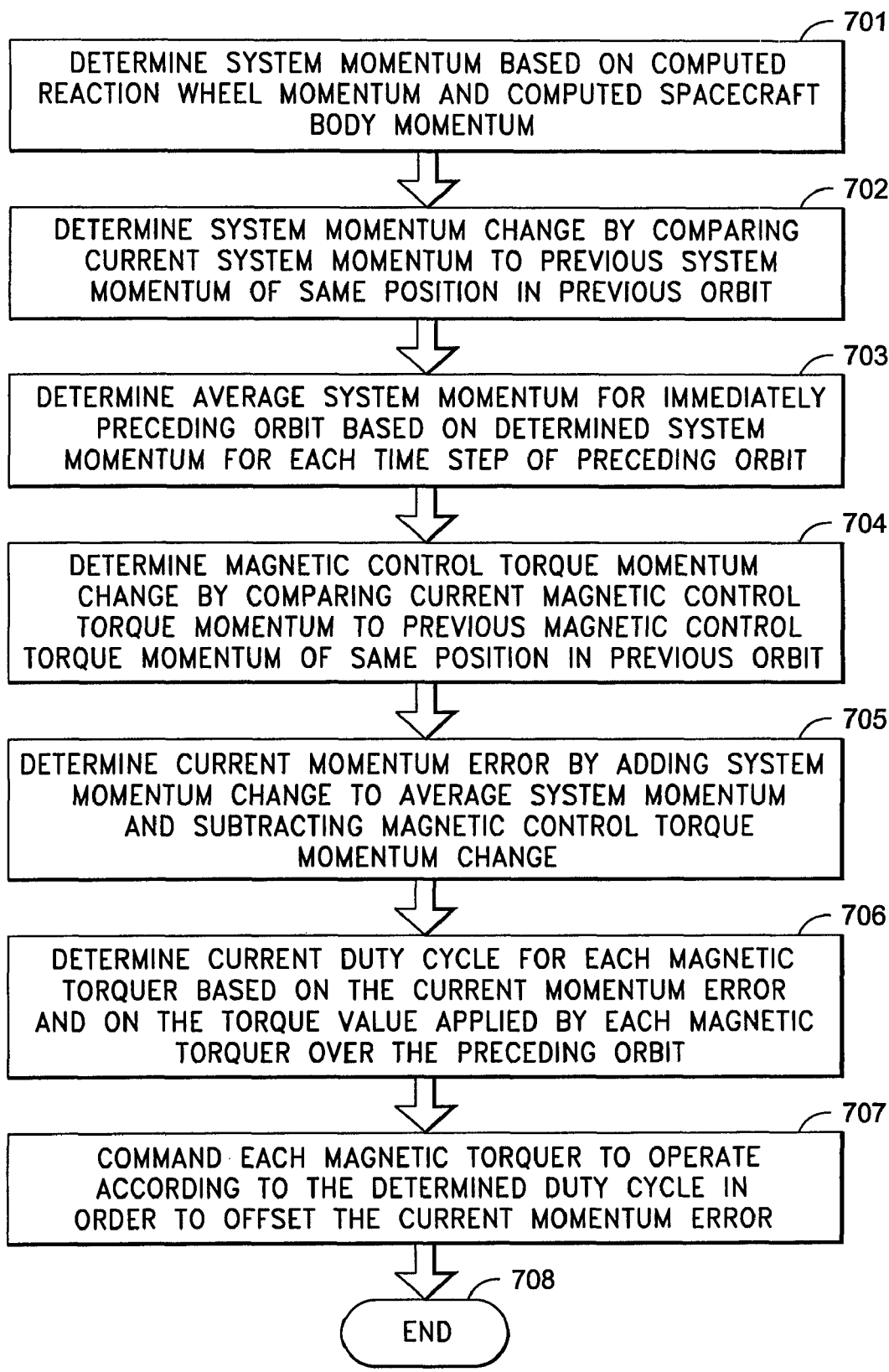
FIG. 7 is a flowchart for explaining the process of maintaining magnetic momentum control according to one embodiment of the present invention.

FIG. 7 is a flowchart for explaining an exemplary process of maintaining magnetic momentum control according to the present invention. In FIG. 7, the process starts at step 701 in which the reaction wheel assembly (RWA) momentum and the spacecraft body momentum are calculated, and are added to calculate the current system momentum. In step 702, the system momentum change is determined by comparing the current system momentum to a previous system momentum corresponding to the same position of the immediately preceding orbit.

Then, the average system momentum is determined for the immediately preceding orbit by summing the system momentum values calculated for all time steps of the immediately preceding orbit (step 703). In step 704, the magnetic control torque momentum change is determined by comparing the current magnetic control torque momentum, due to the magnetic torquers, to a previous magnetic control torque momentum corresponding to the same position of the immediately preceding orbit.

The current momentum error is then determined in step 705 by adding the system momentum change to the average system momentum, and then subtracting the magnetic control torque momentum change. The duty cycles for the magnetic torquers for the current time step are then determined based on the current momentum error and on the torque value applied by each magnetic torquer over the immediately preceding orbit (step 706). Lastly, in step 707, each magnetic torquer is commanded in accordance with the determined respective duty cycle for the current time step in order to offset the current momentum error. The process then ends in step 708. As mentioned above, the polarity of the determined duty cycle values may be positive or negative, which thereby corresponds to the polarity of the current that is applied to the magnetic torquers in response to the duty cycle commands.

In this manner, the present invention provides an MMC system which responds to the secular momentum error component, while ignoring the cyclic momentum components. The method and system of the present invention also takes into account the variation of the Earth's magnetic field over the entire orbit, and applies magnetic momentum control torques where it is most efficient to do so. Accordingly, the present invention results in significantly reduced torquer duty cycles for the magnetic torquers and thereby reduces the power consumption used for the magnetic torquers, allowing for the use of smaller magnetic torquers.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for maintaining momentum control of an orbiting spacecraft that uses a plurality of reaction wheel assemblies and a plurality of magnetic torquers to control the spacecraft momentum, each orbit of the spacecraft being comprised of a set of time steps, the method comprising:

a current momentum error determining step of determining a current momentum error for a current time step of a current orbit by adding a system momentum change determined for an immediately preceding orbit to an average system momentum determined for the immediately preceding orbit, and then subtracting a magnetic control torque momentum change determined for the immediately preceding orbit;

a duty cycle determining step of determining a current duty cycle for each of the magnetic torquers based on the current momentum error and on a torque value applied by each magnetic torquer at each time step of the immediately preceding orbit; and a command step of commanding each magnetic torquer to operate at the current time step in accordance with its respective determined current duty cycle, wherein the magnetic torquers apply a magnetic momentum control torque to the spacecraft to offset the current momentum error.

2. The method according to claim 1, further including:
a reaction wheel momentum determining step of determining a current reaction wheel momentum for a time step immediately preceding the current time step of the current orbit; and
a spacecraft body momentum determining step of determining a current spacecraft body momentum for a time step immediately preceding the current time step of the current orbit,
a system momentum change determining step of determining the system momentum change by calculating a current system momentum based on the addition of the current reaction wheel momentum and the current spacecraft body momentum, and comparing the current system momentum to a previous system momentum that is based on the addition of a previous reaction wheel momentum and a previous spacecraft body momentum both of which were determined at a previous orbit time step which is one orbit period prior to the immediately preceding time step of the current time step; and
an average system momentum determining step of determining the average system momentum by adding a determined system momentum for each of a number of preceding time steps corresponding to one orbit period.

3. The method according to claim 2, further including:
a magnetic control torque momentum change determining step of determining the magnetic control torque momentum change by comparing a current magnetic control torque momentum that is calculated for the immediately preceding time step of the current time step with a previous magnetic control torque momentum that is calculated for a previous orbit time step which is one orbit period prior to the immediately preceding time step of the current time step.

4. The method according to claim 3, wherein the system momentum change is determined according to the formula:

$$\Delta H_{sys}[k] = H_{sys}[k-1] - H_{sys}[k-1-n]$$

where $$n \cdot t_s = t_{orbit}$$

where $\Delta H_{sys}[k]$ is the system momentum change as determined at the current time step k, $H_{sys}[k-1]$ is the system momentum for the immediately preceding time step [k-1], and $H_{sys}[k-1-n]$ is the system momentum for the previous orbit time step [k-1-n] which is one orbit period prior to the immediately preceding time step, and where the system momentum $H_{sys} = H_{s/c} + H_{rwa}$, where $H_{s/c}$ is the determined momentum of the spacecraft body and $H_{rwa}$ is the determined momentum of the reaction wheel assemblies, wherein the average system momentum is determined according to the formula:

$$\overline{H}_{sys}[k] = \sum_{(j=k-1-n)}^{(k-1)} \frac{H_{sys}[j]}{n+1}$$

where $\overline{H}_{sys}[k]$ is the average system momentum for the current time step k, and all values of $H_{sys}$ are averaged for the time steps between the immediately preceding time step [k-1] and the previous orbit time step [k-1-n] which is one orbit period prior to the immediately preceding time step, wherein the magnetic control torque momentum change is determined according to the formula:

$$\Delta H_{cnt}[k] = H_{cnt}[k-1] - H_{cnt}[k-1-n]$$

where $\Delta H_{cnt}[k]$ is the magnetic control torque momentum change as determined at the current time step k, $H_{cnt}[k-1]$ is the magnetic control torque momentum for the immediately preceding time step [k-1], and $H_{cnt}[k-1-n]$ is the magnetic control torque momentum for the previous orbit time step [k-1-n] which is one orbit period prior to the immediately preceding time step, wherein the current momentum error is determined according to the formula:

$$H_{err}[k] = \Delta H_{sys}[k] - \Delta H_{cnt}[k] + \overline{H}_{sys}[k]$$

and
wherein the duty cycles for the magnetic torquers for the current time step ($dc_1[k]$ and $dc_2[k]$) are calculated according to the formula:

$$\begin{bmatrix} dc_1[k-n] \\ dc_2[k-n] \\ dc_1[k-n+1] \\ dc_2[k-n+1] \\ \vdots \\ dc_1[k-1] \\ dc_2[k-1] \\ dc_1[k] \\ dc_2[k] \end{bmatrix} = -\frac{1}{t_s} L^+ H_{err}[k]$$

where $L^+ = \text{pseudoinverse}([T_1[k-n]T_2[k-n] \ldots T_1[k]T_2[k]])$ and where the duty cycle (dc) vector on the left side of the equation is the calculated set of duty cycles for each of the magnetic torquers for all time steps between the current time step [k] and a previous orbit time step [k-n] which is one orbit period prior to the current time step, where $t_s$ is a time interval between successive time steps of the orbit, and $T_1$ and $T_2$ are the control torque values applied by the magnetic torquers, respectively, at each time step of the immediately preceding orbit, from [k-n] to [k].

5. The method according to claim 4, wherein the control torque values, $T_1$ and $T_2$, are calculated according to the formula:

$$T_i(t) = m_i(t) \times B(t)$$

where $m_i(t)$ is a dipole moment vector of the respective magnetic torquer, and $B(t)$ is a time-variant Earth magnetic field vector.

6. The method according to claim 4, wherein, in the command step, the magnetic torquers are commanded to operate at the current time step [k] in accordance with their respective determined current duty cycles, $dc_1[k]$ and $dc_2[k]$.

7. A magnetic momentum control system for maintaining momentum control of an orbiting spacecraft that uses a plurality of reaction wheel assemblies, each orbit of the spacecraft being comprised of a set of time steps, the magnetic momentum control system comprising:
a plurality of magnetic torquers; and
a processor operable to perform:
a current momentum error determining step of determining a current momentum error for a current time step of a current orbit by adding a system momentum change determined for an immediately preceding orbit to an average system momentum determined for the immediately preceding orbit, and then subtracting a magnetic control torque momentum change determined for the immediately preceding orbit, a duty cycle determining step of determining a current duty cycle for each of the magnetic torquers based on the current momentum error and on a torque value applied by each magnetic torquer at each time step of the immediately preceding orbit, and a command step of commanding each magnetic torquer to operate for the current time step in accordance with its respective determined current duty cycle, wherein the magnetic torquers apply a magnetic momentum control torque to the spacecraft to offset the current momentum error.

8. The magnetic momentum control system according to claim 7, wherein the processor is operable to further perform:

a reaction wheel momentum determining step of determining a current reaction wheel momentum for a time step immediately preceding the current time step of the current orbit; and a spacecraft body momentum determining step of determining a current spacecraft body momentum for a time step immediately preceding the current time step of the current orbit, a system momentum change determining step of determining the system momentum change by calculating a current system momentum based on the addition of the current reaction wheel momentum and the current spacecraft body momentum, and comparing the current system momentum to a previous system momentum that is based on the addition of a previous reaction wheel momentum and a previous spacecraft body momentum both of which were determined at a previous orbit time step which is one orbit period prior to the immediately preceding time step of the current time step; and an average system momentum determining step of determining the average system momentum by adding a determined system momentum for each of a number of preceding time steps corresponding to one orbit period.

9. The magnetic momentum control system according to claim 8, wherein the processor is operable to further perform:

a magnetic control torque momentum change determining step of determining the magnetic control torque momentum change by comparing a current magnetic control torque momentum that is calculated for the immediately preceding time step of the current time step with a previous magnetic control torque momentum that is calculated for a previous orbit time step which is one orbit period prior to the immediately preceding time step of the current time step.

10. The magnetic momentum control system according to claim 9, wherein the system momentum change is determined according to the formula:

$$\Delta H_{sys}[k]=H_{sys}[k-1]-H_{sys}[k-1-n]$$

where $$n \cdot t_s = t_{orbit}$$

where $\Delta H_{sys}[k]$ is the system momentum change as determined at the current time step k, $H_{sys}[k-1]$ is the system momentum for the immediately preceding time step $[k-1]$, and $H_{sys}[k-1-n]$ is the system momentum for the previous orbit time step $[k-1-n]$ which is one orbit period prior to the immediately preceding time step, and where the system momentum $H_{sys}=H_{s/c}+H_{rwa}$, where $H_{s/c}$ is the determined momentum of the spacecraft body and $H_{rwa}$ is the determined momentum of the reaction wheel assemblies, wherein the average system momentum is determined according to the formula:

$$\overline{H}_{sys}[k] = \sum_{(j=k-1-n)}^{(k-1)} \frac{H_{sys}[j]}{n+1}$$

where $\overline{H}_{sys}[k]$ is the average system momentum for the current time step k, and all values of $H_{sys}$ are averaged for the time steps between the immediately preceding time step $[k-1]$ and the previous orbit time step $[k-1-n]$ which is one orbit period prior to the immediately preceding time step, wherein the magnetic control torque momentum change is determined according to the formula:

$$\Delta H_{cnt}[k]=H_{cnt}[k-1]-H_{cnt}[k-1-n]$$

where $\Delta H_{cnt}[k]$ is the magnetic control torque momentum change as determined at the current time step k, $H_{cnt}[k-1]$ is the magnetic control torque momentum for the immediately preceding time step $[k-1]$, and $H_{cnt}[k-1-n]$ is the magnetic control torque momentum for the previous orbit time step $[k-1-n]$ which is one orbit period prior to the immediately preceding time step, wherein the current momentum error is determined according to the formula:

$$H_{err}[k]=\Delta H_{sys}[k]-\Delta H_{cnt}[k]+\overline{H}_{sys}[k]$$

and wherein the duty cycles for the magnetic torquers for the current time step ($dc_1[k]$ and $dc_2[k]$) are calculated according to the formula:

$$\begin{bmatrix} dc_1[k-n] \\ dc_2[k-n] \\ dc_1[k-n+1] \\ dc_2[k-n+1] \\ \vdots \\ dc_1[k-1] \\ dc_2[k-1] \\ dc_1[k] \\ dc_2[k] \end{bmatrix} = -\frac{1}{t_s}L^+ H_{err}[k]$$

where $$L^+=\text{pseudoinverse}([T_1[k-n]T_2[k-n] \ldots T_1[k]T_2[k]])$$

and where the duty cycle (dc) vector on the left side of the equation is the calculated set of duty cycles for each of the magnetic torquers for all time steps between the current time step [k] of the current orbit and a previous orbit time step [k-n] which is one orbit prior to the current time step, where $t_s$ is a time interval between successive time steps of the orbit, and $T_1$ and $T_2$ are the control torque values applied by the magnetic torquers, respectively, at each time step of the immediately preceding orbit, from [k-n] to [k].

11. The magnetic momentum control system according to claim 10, wherein the control torque values, $T_1$ and $T_2$, are calculated according to the formula:

$$T_i(t) = m_i(t) \times B(t)$$

where $m_i(t)$ is a dipole moment vector of the respective magnetic torquer, and $B(t)$ is a time-variant Earth magnetic field vector.

12. The magnetic momentum control system according to claim 10, wherein, in the command step performed by the processor, the magnetic torquers are commanded to operate at the current time step [k] in accordance with their respective determined current duty cycles, $dc_1[k]$ and $dc_2[k]$.

13. An orbiting spacecraft, each orbit of the spacecraft being comprised of a set of time steps, the spacecraft comprising:
- a plurality of reaction wheel assemblies;
- a plurality of magnetic torquers; and
- a processor operable to perform:
    - a current momentum error determining step of determining a current momentum error for a current time step of a current orbit by adding a system momentum change determined for an immediately preceding orbit to an average system momentum determined for the immediately preceding orbit, and then subtracting a magnetic control torque momentum change determined for the immediately preceding orbit,
    - a duty cycle determining step of determining a current duty cycle for each of the magnetic torquers based on the current momentum error and on a torque value applied by each magnetic torquer at each time step of the immediately preceding orbit, and
    - a command step of commanding each magnetic torquer to operate for the current time step in accordance with its respective determined current duty cycle, wherein the magnetic torquers apply a magnetic momentum control torque to the spacecraft to offset the current momentum error.

14. The spacecraft according to claim 13, wherein the processor is operable to further perform:
- a reaction wheel momentum determining step of determining a current reaction wheel momentum for a time step immediately preceding the current time step of the current orbit; and
- a spacecraft body momentum determining step of determining a current spacecraft body momentum for a time step immediately preceding the current time step of the current orbit,
- a system momentum change determining step of determining the system momentum change by calculating a current system momentum based on the addition of the current reaction wheel momentum and the current spacecraft body momentum, and comparing the current system momentum to a previous system momentum that is based on the addition of a previous reaction wheel momentum and a previous spacecraft body momentum both of which were determined at a previous orbit time step which is one orbit period prior to the immediately preceding time step of the current time step; and
- an average system momentum determining step of determining the average system momentum by adding a determined system momentum for each of a number of preceding time steps corresponding to one orbit period.

15. The spacecraft according to claim 14, wherein the processor is operable to further perform:
- a magnetic control torque momentum change determining step of determining the magnetic control torque momentum change by comparing a current magnetic control torque momentum that is calculated for the immediately preceding time step of the current time step with a previous magnetic control torque momentum that is calculated for a previous orbit time step which is one orbit period prior to the immediately preceding time step of the current time step.

16. The spacecraft according to claim 15, wherein the system momentum change is determined according to the formula:

$$\Delta H_{sys}[k] = H_{sys}[k-1] - H_{sys}[k-1-n]$$

where $$n \cdot t_s = t_{orbit}$$

where $\Delta H_{sys}[k]$ is the system momentum change as determined at the current time step k, $H_{sys}[k-1]$ is the system momentum for the immediately preceding time step [k−1], and $H_{sys}[k-1-n]$ is the system momentum for the previous orbit time step [k−1−n] which is one orbit period prior to the immediately preceding time step, and where the system momentum $H_{sys} = H_{s/c} + H_{rwa}$, where $H_{s/c}$ is the determined momentum of the spacecraft body and $H_{rwa}$ is the determined momentum of the reaction wheel assemblies, wherein the average system momentum is determined according to the formula:

$$\overline{H}_{sys}[k] = \sum_{(j=k-1-n)}^{(k-1)} \frac{H_{sys}[j]}{n+1}$$

where $\overline{H}_{sys}[k]$ is the average system momentum for the current time step k, and all values of $H_{sys}$ are averaged for the time steps between the immediately preceding time step [k−1] and the previous orbit time step [k−1−n] which is one orbit period prior to the immediately preceding time step, wherein the magnetic control torque momentum change is determined according to the formula:

$$\Delta H_{cnt}[k] = H_{cnt}[k-1] - H_{cnt}[k-1-n]$$

where $\Delta H_{cnt}[k]$ is the magnetic control torque momentum change as determined at the current time step k, $H_{cnt}[k-1]$ is the magnetic control torque momentum for the immediately preceding time step [k−1], and $H_{cnt}[k-1-n]$ is the magnetic control torque momentum for the previous orbit time step [k−1−n] which is one orbit period prior to the immediately preceding time step, wherein the current momentum error is determined according to the formula:

$$H_{err}[k] = \Delta H_{sys}[k] - \Delta H_{cnt}[k] + \overline{H}_{sys}[k]$$

and wherein the duty cycles for the magnetic torquers for the current time step ($dc_1[k]$ and $dc_2[k]$) are calculated according to the formula:

$$\begin{bmatrix} dc_1[k-n] \\ dc_2[k-n] \\ dc_1[k-n+1] \\ dc_2[k-n+1] \\ \vdots \\ dc_1[k-1] \\ dc_2[k-1] \\ dc_1[k] \\ dc_2[k] \end{bmatrix} = -\frac{1}{t_s}L + H_{err}[k]$$

where $L^+ = \text{pseudoinverse}([T_1[k-n]T_2[k-n] \ldots T_1[k]T_2[k]])$ and where the duty cycle (dc) vector on the left side of the equation is the calculated set of duty cycles for each of the magnetic torquers for all time steps between the current time step [k] and a previous orbit time step [k−n] which is one orbit period prior to the current time step, where $t_s$ is the time interval between successive time steps of the orbit, and $T_1$ and $T_2$ are the control torque values applied by the magnetic torquers, respectively, at each time step of the immediately preceding orbit, from [k−n] to [k].

17. The spacecraft according to claim 16, wherein the control torque values, $T_1$ and $T_2$, are calculated according to the formula:

$T_i(t) = m_i(t) \times B(t)$ where $m_i(t)$ is a dipole moment vector of the respective magnetic torquer, and B(t) is a time-variant Earth magnetic field vector.

18. The spacecraft according to claim 16, wherein, in the command step performed by the processor, the magnetic torquers are commanded to operate at the current time step [k] in accordance with their respective determined current duty cycles, $dc_1[k]$ and $dc_2[k]$.

* * * * *